(12) United States Patent
Porte et al.

(10) Patent No.: US 8,142,144 B2
(45) Date of Patent: Mar. 27, 2012

(54) TURBINE ENGINE FOR AIRCRAFT

(75) Inventors: Alain Porte, Colomiers (FR); Frederic Chelin, Encausse (FR); David Lambert, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 642 days.

(21) Appl. No.: 12/307,874

(22) PCT Filed: Jul. 4, 2007

(86) PCT No.: PCT/FR2007/001133
§ 371 (c)(1),
(2), (4) Date: Jan. 7, 2009

(87) PCT Pub. No.: WO2008/006960
PCT Pub. Date: Jan. 17, 2008

(65) Prior Publication Data
US 2009/0290978 A1    Nov. 26, 2009

(30) Foreign Application Priority Data

Jul. 12, 2006   (FR) ...................... 06 06336

(51) Int. Cl.
*F04D 29/40*   (2006.01)
(52) U.S. Cl. .................... 415/200; 415/213.1
(58) Field of Classification Search ............ 415/197, 415/200, 215.1, 219.1
See application file for complete search history.

(56) References Cited

U.S. PATENT DOCUMENTS

| 2,463,124 A | 3/1949 | Sims |
| 3,989,984 A | 11/1976 | Amason |
| 4,556,439 A | 12/1985 | Bannink |
| 6,327,132 B1 | 12/2001 | Luc Andrivet |
| 6,829,883 B2 * | 12/2004 | Sathianathan et al. ....... 60/226.1 |
| 2005/0082432 A1 | 4/2005 | Nordman |
| 2009/0324390 A1* | 12/2009 | Harper et al. ............... 415/119 |

FOREIGN PATENT DOCUMENTS

| EP | 0 269 458 | 6/1988 |
| EP | 1 277 919 | 1/2003 |
| EP | 1 515 005 | 3/2005 |
| FR | 2 765 066 | 12/1998 |
| GB | 1 455 235 | 11/1976 |

OTHER PUBLICATIONS

International Search Report dated Jan. 10, 2008 w/ English translation.
Written Opinion of the International Searching Authority with English translation, Jan. 10, 2008.
M. McCarthy, "Bolted Joints in Composite Aircraft Structures," Composit Workshop on Joining and Assembling Technologies, [Online] Apr. 11, 2003, XP002461150 Centro Ricerche Fiat, Turin, Italy Retrieved from the Internet: URL:http://www.smr.ch/bojcas/Reports/COMPOSIT-presentation.pdf> [retrieved on Dec. 5, 2007].

* cited by examiner

*Primary Examiner* — Stephen W Smoot
(74) *Attorney, Agent, or Firm* — Dickinson Wright PLLC

(57) ABSTRACT

Disclosed is an aircraft turbine engine. The turbine engine includes an air intake having a tubular internal wall and a fan enclosed by a tubular fan casing, and the rear end of the said air intake internal wall and the front end of the fan casing are joined together by at least one fastener. The air intake internal wall, the fan casing, or both, are comprised of a resin/fiber composite. The rear end of the air intake internal wall and the front end of the fan casing are uniform, and have no projections that join the internal wall and casing together.

15 Claims, 5 Drawing Sheets

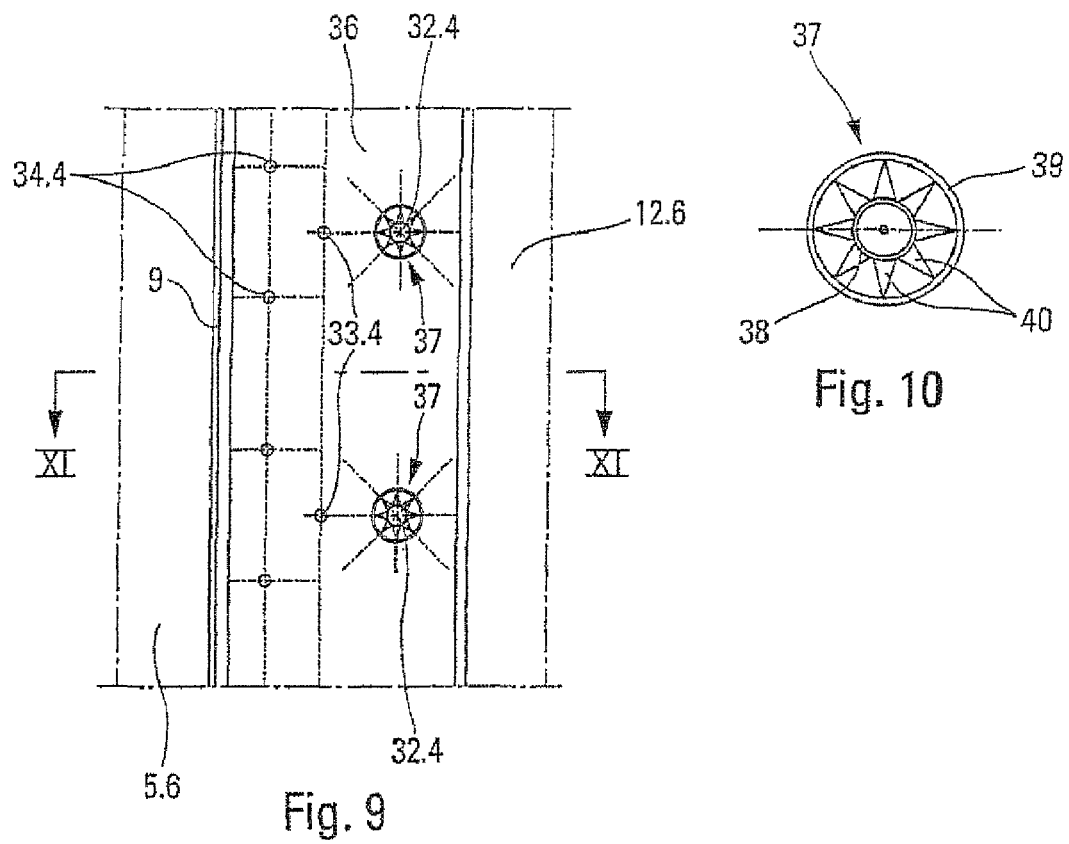
Fig. 9
Fig. 10
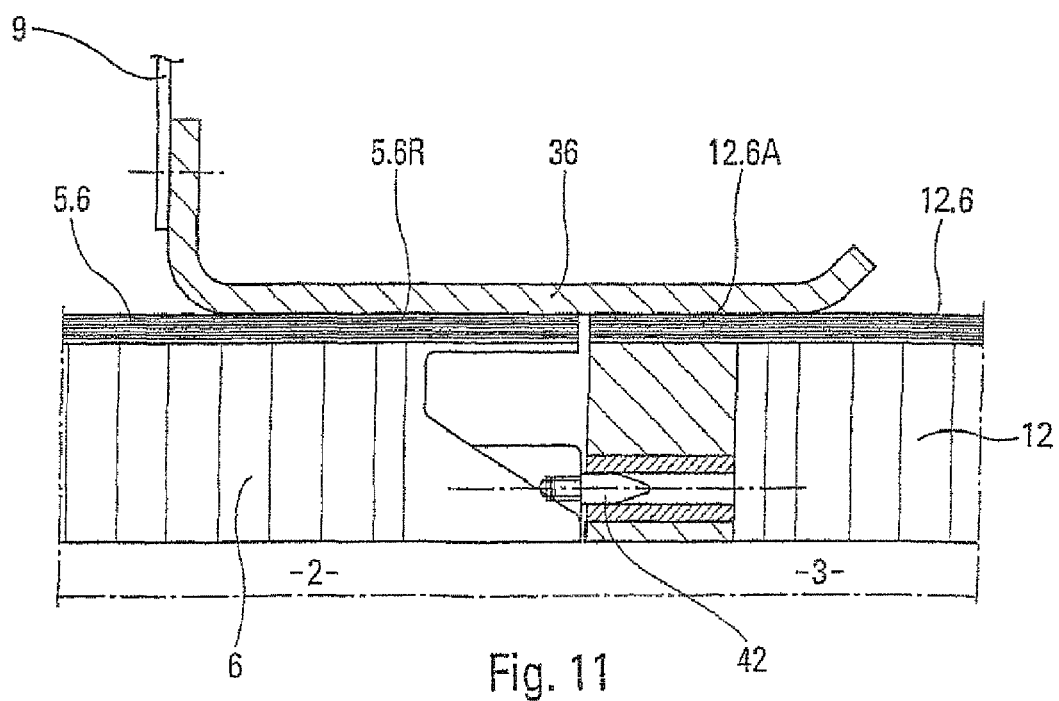
Fig. 11

TURBINE ENGINE FOR AIRCRAFT

FIELD OF THE INVENTION

The present invention relates to aircraft turbine engines and, more especially, to the connection between the air intake and the fan casing of such a turbine engine.

BACKGROUND OF THE INVENTION

In known turbine engines, the internal wall of the air intake and the fan casing are made of metal and the rear end of said internal wall of the air intake and the front end of said fan casing have collaborating projecting peripheral flanges to allow said air intake and said casing to be joined together using fasteners (screws, bolts, etc) of which the axes run parallel to the longitudinal axis of the turbine engine and which pass through said flanges.

Given the mechanical, thermal and mass properties of resin/fiber composites, it would be advantageous if it were possible for said internal wall of the air intake and said fan casing to be produced entirely in the form of components made of such composite. However, tests aimed at achieving this have not proved advantageous because, during use, the fibers delaminate at the 90° elbow where the peripheral flanges meet the tubular remainder of said internal wall and of said casing, which delamination leads to a substantial drop in the mechanical strength of said components and even causes them to break.

SUMMARY OF THE INVENTION

It is an object of the present invention to remedy this disadvantage.

To this end, according to the invention, the aircraft turbine engine having a longitudinal axis and comprising:
  an air intake provided with a tubular internal wall; and
  a fan, supplied with air by said air intake and enclosed in a casing, which is also tubular, the rear end of said internal wall of the air intake and the front end of said casing of the fan being joined together using fasteners, such as screws, bolts or the like,
is notable in that:
  at least one of said components that are said internal wall of the air intake and said casing of the fan is made of a resin/fiber composite;
  said rear end of said internal wall of the air intake and said front end of said fan casing are uniform, with no projections such as peripheral flanges or the like that can be used to join said internal wall and said casing together; and
  the axes of said fasteners make an angle of at least 60° with respect to said longitudinal axis of the turbine engine.

Thus, by virtue of the present invention, it is possible to dispense with the need to produce connecting flanges in the composite components that are the said internal wall of the air intake and said fan casing. The risks of delamination at the elbow where said flanges are connected are thus avoided.

Said internal wall of the air intake and said fan casing may both be made of a resin/liber composite and said axes of the fasteners may be at least approximately orthogonal to said longitudinal axis of the turbine engine.

In a first embodiment of the present invention, said rear end of the internal wall of the air intake and said front end of the fan casing are fitted one inside the other and said fasteners pass through those parts of said front and rear ends that are fitted one inside the others When the ends are fitted one inside the other in this way, the rear end of said internal wall of the air intake may penetrate the front end of said fan casing or, alternatively, it is the front end of said fan casing that penetrates the rear end of said internal wall of the air intake. In addition, the ends may be fitted one inside the other with direct contact between said front and rear ends or alternatively with at least one spacer ring interposed between said front and rear ends. Of course, in the latter instance, said fasteners also pass through the spacer ring or rings. Furthermore, regardless of how the parts are fitted one inside the other, the contact surface may be cylindrical or conical.

In a second embodiment, said rear end of said internal wall of the air intake and said front end of said fan casing are joined together via a connecting ring (made as a single piece or in several angularly distributed segments) that they penetrate, fasteners pass through those parts of said connecting ring and of said rear end of said internal wall of the air intake that face one another, and other fasteners pass through those parts of said connecting ring and of said front end of said fan casing that face one another. Once again, the surface for contact between said connecting ring, on the one hand, and said fronL and rear end, on the other, may be cylindrical or conical. As an option, said connecting ring may have a transverse partition.

Whatever the embodiment of the present invention, it is possible to ensure that:
  at least some of said fasteners are bolts, the nuts of which are captive in one or other of said front and rear ends;
  at least some of said fasteners are connected to one of said front or rear ends via plastically deformable members so that the energy of a broken fan blade striking the fan casing can be at least partially absorbed;
  centering means can be used to position one of said front or rear ends relative to the other accurately about the longitudinal axis of the turbine engine.

The composite of which said internal wall of the air intake and said fan casing are made may contain carbon, boron, glass, silicon carbide, etc. fiber and said internal wall and said casing may be obtained by any known method (filament winding, coiling, the draping of fiber or fabric prepregs, etc).

BRIEF DESCRIPTION OF THE DRAWINGS

The figures of the attached drawing will make it easier to understand how the invention may be embodied. In these figures, identical references denote elements that are similar.

FIG. 9 is a partial view from above of the joining example of FIG. 8.

FIG. 10 is a plan view of a plastically deformable ring used in the embodiment of FIG. 8.

FIG. 11 corresponds to a section on XI-XI of FIG. 9.

DETAILED DESCRIPTION OF THE INVENTION

Figure 1:
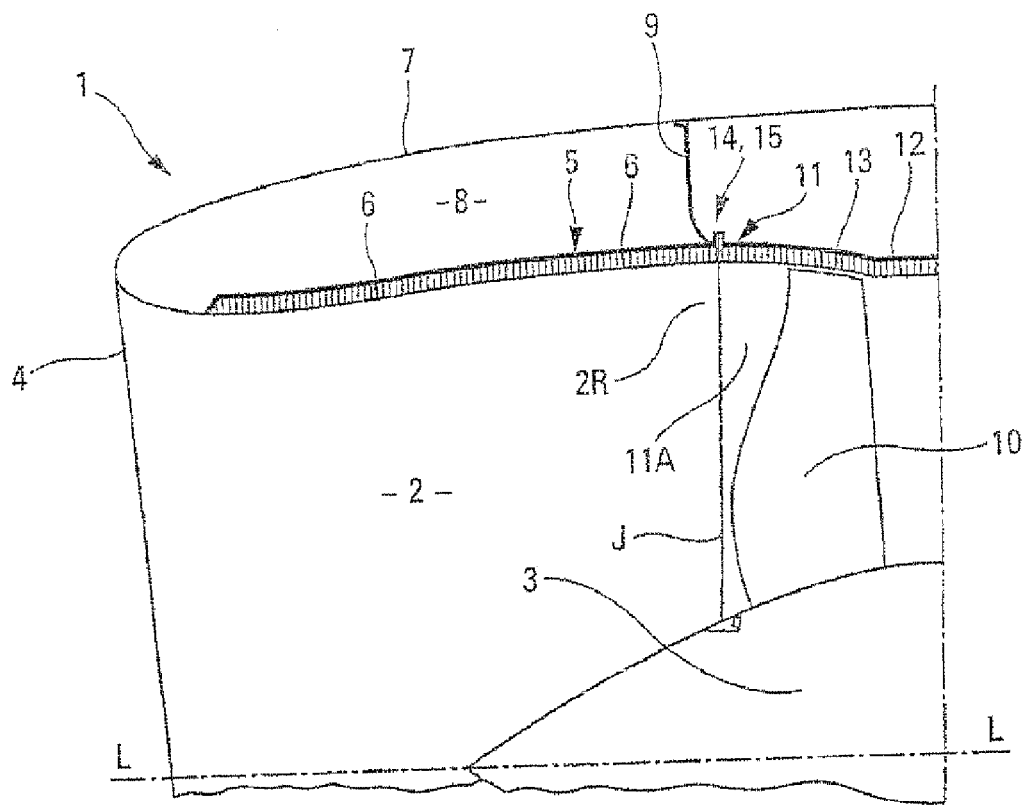
FIG. 1 shows, in partial schematic half section, the front part of a known turbine engine.

The turbine engine of known type, 1, the front tart of which is depicted schematically and partially in FIG. 1, has a longitudinal axis L-L. This front part essentially comprises a tubular air intake 2 and a fan 3.

The tubular air intake 2 has a leading edge 4 and is provided with a metal tubular internal wall 5, for example made of aluminum, internally bearing a sound-deadening tubular covering 6. An external cowl 7 surrounds said air intake and together with said internal wall 5 defines a chamber 8 of annular cross section, closed off by an annular rear partition 9 at the opposite end to said leading edge 4.

The fan 3 has blades 10 and is surrounded by a fan casing 11 consisting of a metal tubular component 12, for example made of aluminum, and internally bearing a sound-deadening tubular covering 13.

The rear end 2R of the air intake 2 and the front end 11A of the Fan casing 11 are joined together along a joining plane J.

Figure 2:
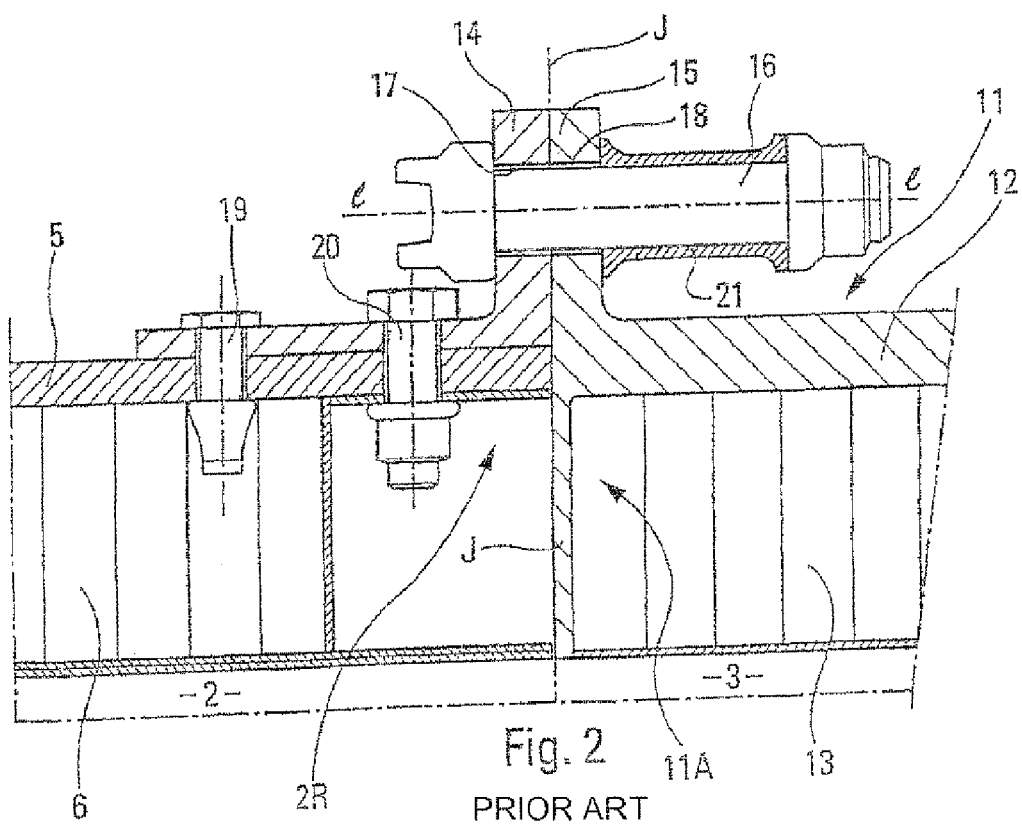
FIG. 2 shows, also in partial schematic half section, one example of how the rear end of the air intake and the front end of the fan casing are joined together in the known turbine engine of FIG. 1.
Figure 3:
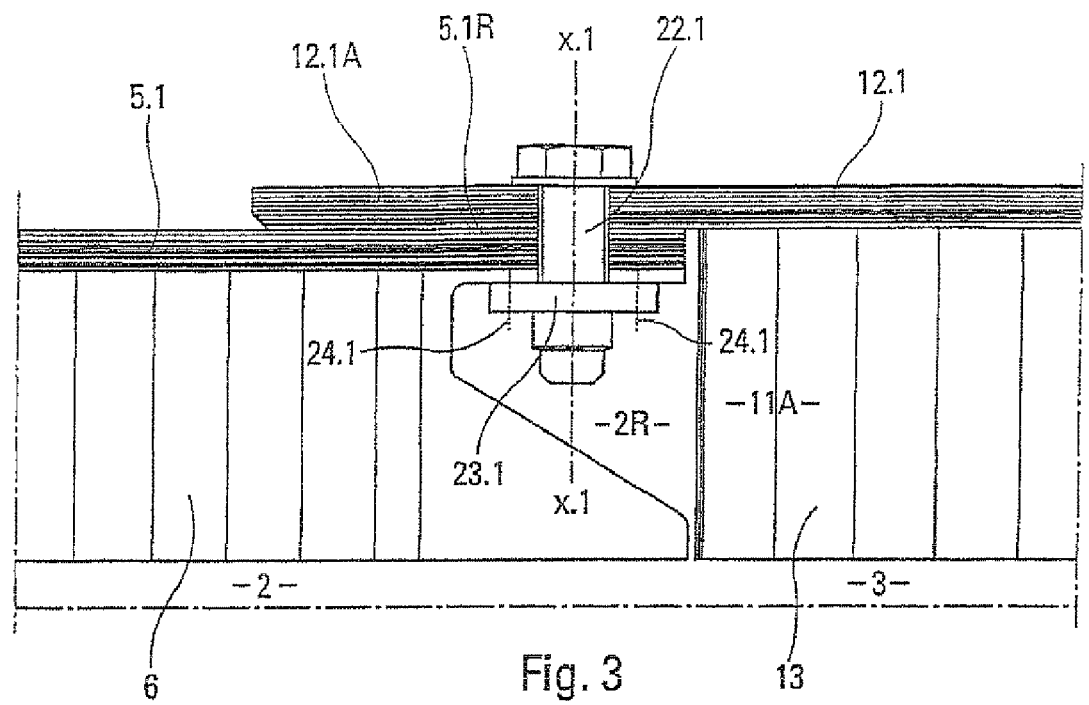
FIGS. 3 to 8 illustrate several possible ways of coining the rear end of the air intake and the front end of the fan casing together in a turbine engine according to the present invention.

As shown on a larger scale in FIG. 2, the rear 2R and front 11A ends are assembled using two collaborating annular flanges 14 and 15 projecting out from the internal wall 5 and from the tubular component 1-2 and pressed against one another by bolts 16 the axes l-l of which are parallel to the longitudinal axis L-L and which pass through opposing drillings 17 and 18 made in said flanges 14 and 15. In the known embodiment of FIG. 2, the annular flange 14 is attached to the internal wall 5 and secured to the latter by bolts 19 and 20. By contrast, in this example the flange 15 is machined as one piece with the tubular component 12

Furthermore, associated with each bolt 16 is a sleeve 21, through which said bolt 16 passes, and which is secured by said bolt to the flange 15. The sleeves 21 are produced in such a way that they can be compressed plastically in the axial direction. Thus, when a blade 10 of the fan 3 breaks off and strikes the casing 11, the energy of the impact can be at least partially absorbed by said sleeves 21.

FIGS. 3 to 8 show, in a view comparable with FIG. 2, exemplary embodiments according to the present invention, in which the internal wall of the air intake 2 and the fan casing 11 consist of resin/fiber composite tubular components 5.1 to 5.6 and 12.1 to 12.6 respectively, with no projecting flanges at their ends 2R and 11A and which are assembled using fasteners 22.1 to 22.3 and 32.4, 34.4 that are orthogonal to the longitudinal axis L-L of the turbine engine 1.

In the exemplary embodiment of FIG. 31 the tubular component 5.1 made of composite, that forms the internal wall of the air intake 2 and bears the internal sound-deadening covering 6, has a diameter smaller than that of the tubular component 12.1 made of composite that forms the fan casing 11 and bears the internal sound-deadening covering 13, which means that the rear end 5.1R of the component 5.1 made of composite can, preferably with a small amount of friction, penetrate the front end 12.1A of the composite component 12.1. The composite components 5.1 and 12.1 are assembled by transverse bolts 22.1 of which the axes x.1-x.1 are orthogonal to the longitudinal axis L-L of the turbine engine 1 and which pass through the ends 5.1R and 12.1A that face each other. The nuts 23.1 of the bolts 22.1 are captive on the internal wall of the composite component 5.1, for example using screws 24.1 depicted only by centerlines.

Figure 4:
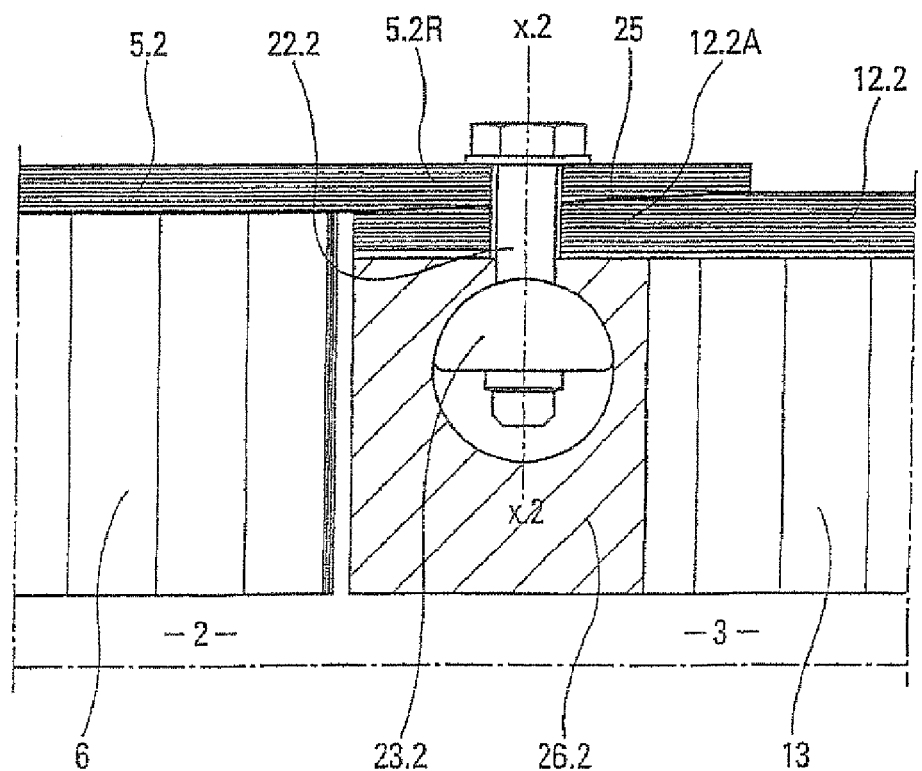

In the alternative form of embodiment illustrated in FIG. 4, the composite tubular component 5.2, that forms the internal wall of the air intake 2 and bears the internal sound-deadening covering 6, has a diameter greater than that of the composite tubular component 12.2 that forms the fan casing St and bears the sound-deadening covering 13. In addition, the rear end 5.2R of the composite component 5.2 is internally conical, while the front end 12.2A of the composite component 12.2 is externally conical. Thus, the front end 12.2A can penetrate the rear end 5.2R, the contact surface 25 of said ends then being conical. The composite components 5.2 and 12.2 are assembled by through-bolts 22.2 of which the axes x.2-x.2 are orthogonal to the longitudinal axis L-L of the turbine engine I and which pass through the ends 5.2R and 12.2A that face one another, The nuts 23.2 of the bolts 22.2 are captive on components 26.2 attached on the inside of the front end 12.2A.

Figure 5:
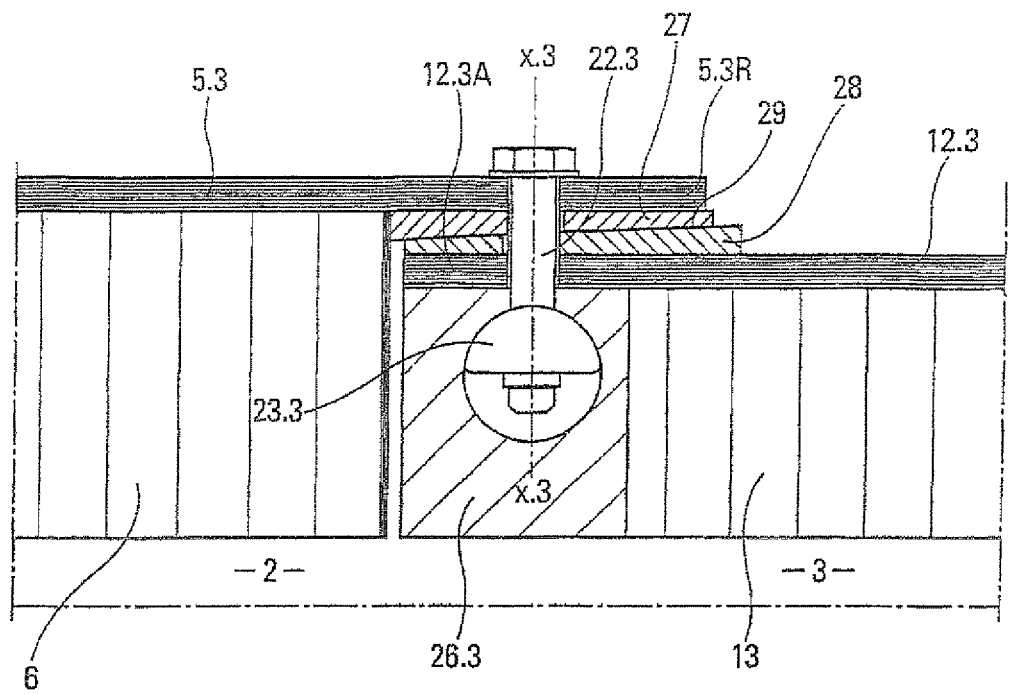

The assembly schematically depicted in FIG. 5 comprises a composite tubular component 5.3 forming the internal wall of the air intake 2 and bearing the internal sound-deadening covering 6, and a composite tubular component 12.3 forming the fan casing 11 and bearing the sound-deadening covering 13. The rear end 5.3R of the component 5.3 surrounds the front end 12.3A of the component 12.3 with some clearance and a system of cylindrical packing pieces 27, 28, with conical joint surfaces 29, is interposed between said ends 5.3R and 12.3A. The latter and the packing pieces 27, 28 have, passing through them, transverse bolts 22.3 of which the axes x.3-x.3 are orthogonal to the longitudinal axis L-L of the turbine engine 1 and which serve to join said composite components 5.3 and 12.3 together. The nuts 23.3 of the bolts 22.3 are captive on components 26.3 attached to the front end 12.3A.

Figure 6:
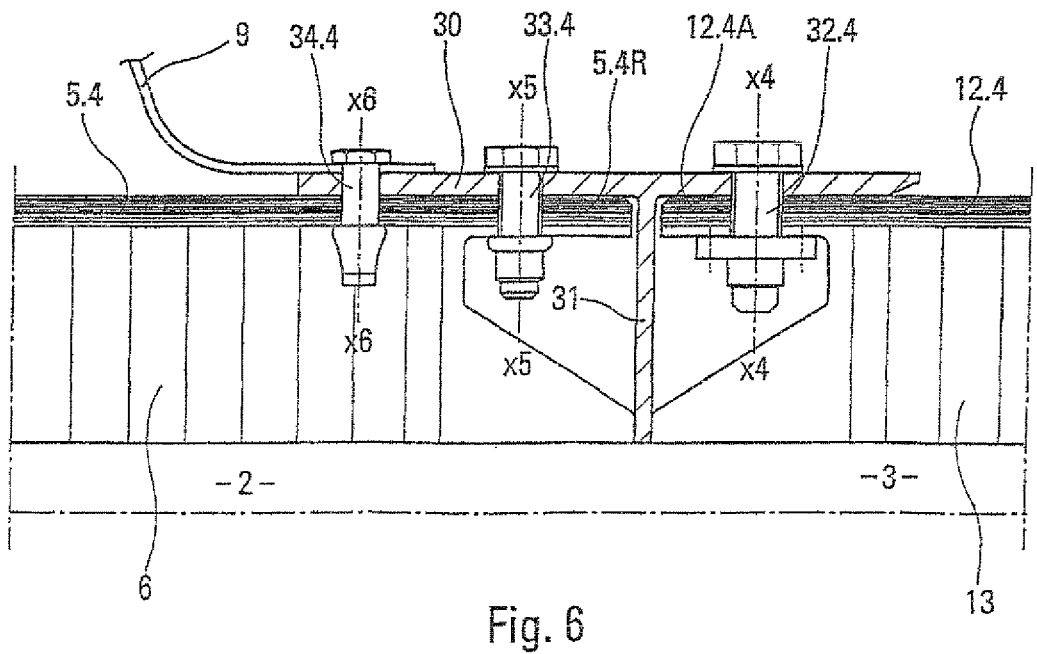

In the exemplary embodiment of FIG. 6, the rear end 5.4R of a composite component 5.4 that forms the internal wall of the air intake 2 and bears the sound-deadening covering 6, and the front end 12.4A of a composite component 12.4 that forms the fan casing 11 and bears the sound-deadening covering 13, are joined together using a connecting ring 30 into the opposite ends of which they fit. The connecting ring 30 has a transverse wall 31 at least approximately representing the joining plane a, and transverse bolts 32.4, 33.4 and 35.4, of which the respective axes x4-x4, x5-x5 and x6-x6 are orthogonal to the longitudinal axis L-L of the turbine engine 1, are used to join the components 5.4 and 12.4 together using said connecting ring 30. At least some of the nuts of the bolts 32.4, 33.4 and 34.4 are captive on the component 5.4 or the component 12.4 and the annular rear partition 9 may be joined to the component 5.4 by the bolts 34.4.

Figure 7:
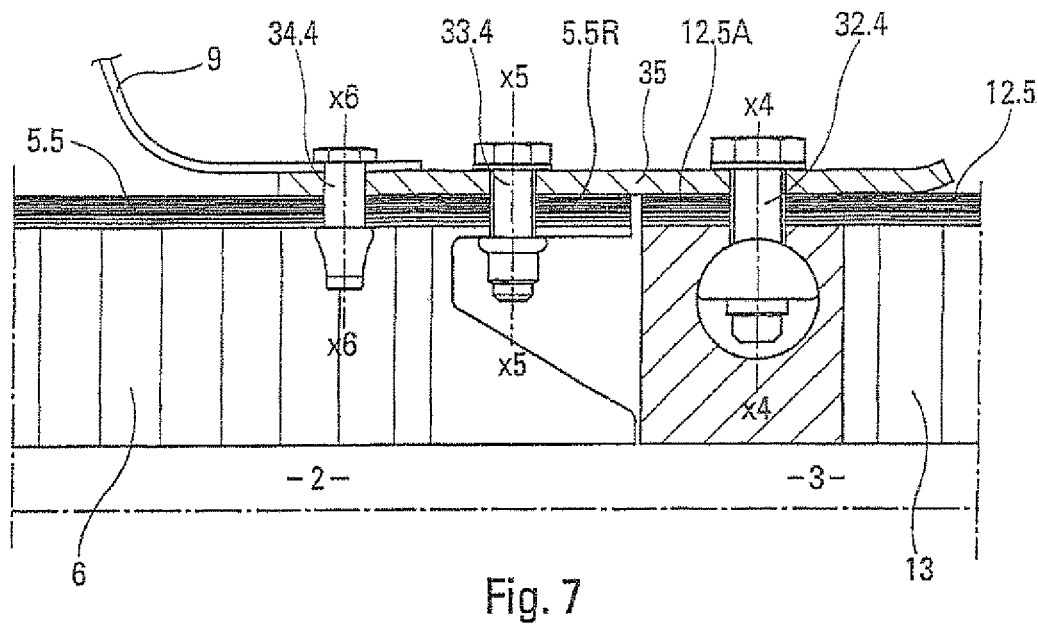

The exemplary embodiment of FIG. 7 is very similar to that of FIG. 6 except that the connecting ring 35, which replaces the connecting ring 30, has no transverse wall (similar to the wall 31).

Figure 8:
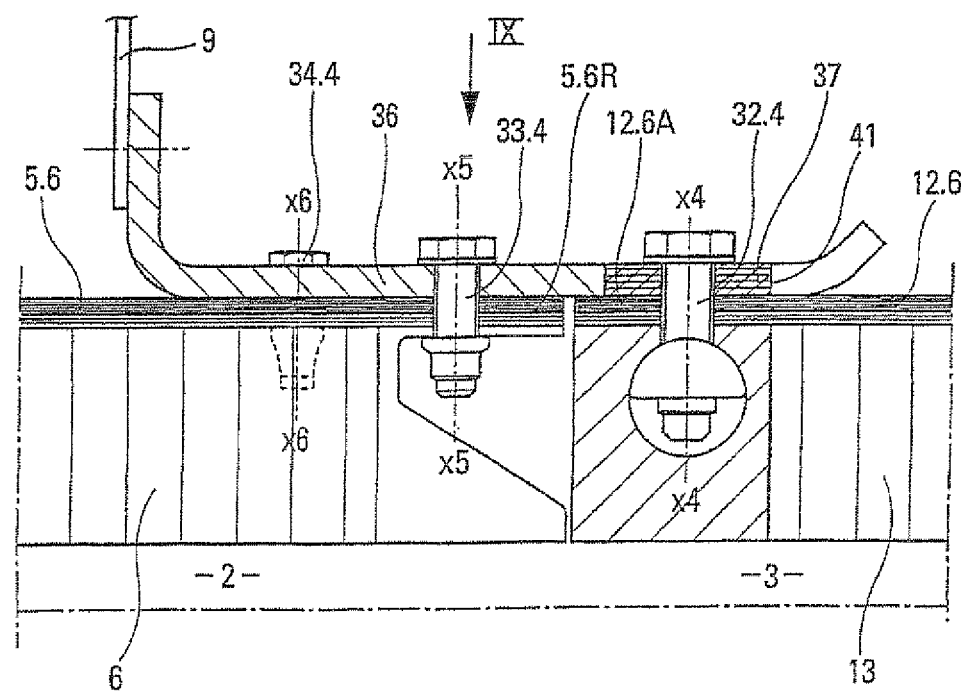

The same is true in the exemplary embodiment of FIGS. 8, 9 and 11 in which the rear 5.6R and front 12.6R ends of two tubular composite components 5.6 and 12.6 (that respectively form the internal wall of the air intake 2 and the fan casing 11 and respectively bear sound-deadening coverings 6 and 13) are joined together by a connecting ring 36 with no transverse wall and by bolts 32.4, 33.4 and 34.4. In this last embodiment, the bolts 32.4 that connect the connecting ring 36 to the composite component 12.6 are connected to the connecting ring 36 by plastically deformable members 37. Each member 37 comprises a central sleeve 38 intended to have a bolt 32.4 passing through it and which is connected to an external ring 39 by plastically deformable spokes 40, it being possible for said external ring to be secured to the connecting ring 36r for example in drillings 41 thereof.

Thus, when a blade 10 of the fan 3 breaks off and strikes the fan casing 11 (component 12.6), the impact energy is absorbed by the deformation of the spokes 40.

Furthermore, the connecting ring 36 may, through its nature or its shaping, allow plastic deformation if a blade should break.

In addition, as illustrated schematically in FIG. 11, the embodiment of FIGS. 8, 9 and 11 comprises centering fingers 42 allowing the relative position of the components 12.6 and 5.6 about the longitudinal axis L-L to be fixed accurately.

Some of the bores through which said fasteners pass may be oblong in order to allow them partially to absorb the impact energy if a blade 10 should break.

Furthermore, is will be noted that the air intake according to the present invention has no breaking impedance, thus improving the overall noise abatement of the sound proofing.

The invention claimed is:

1. An aircraft turbine engine having a longitudinal axis, the aircraft turbine engine comprising:
    an air intake provided with a tubular internal wall; and
    a fan, supplied with air by said air intake and enclosed by a tubular fan casing, with a rear end of said air intake internal wall and a front end of said fan casing being joined together by at least one fastener
    wherein:
    at least one of said air intake internal wall and said fan casing is comprised of a resin/fiber composite;
    said rear end of said air intake internal wall and said front end of said fan casing are uniform, having no projections that join said internal wall and said casing together;
    said at least one fastener has an axis that makes an angle of at least 60° with respect to said turbine engine longitudinal axis; and
    the at least one fastener is connected to at least one of the rear end of said air intake internal wall and the front end of said fan casing by a plastically deformable member so as to allow the rear end of said air intake and the front end of said fan casing to pivot relative to one another.

2. A turbine engine according to claim 1, wherein said air intake internal wall and said fan casing are comprised of a resin/fiber composite.

3. A turbine engine according to claim 1, wherein the at least one fastener axis is substantially orthogonal to said turbine engine longitudinal axis.

4. A turbine engine according to claim 1, wherein the rear end of the air intake internal wall and the front end of the fan casing are fitted one inside the other and the at least one fastener passes through said front and rear ends.

5. A turbine engine according to claim 4, wherein the rear end of said air intake internal wall penetrates the front end of said fan casing.

6. A turbine engine according to claim 4, wherein the front end of said fan casing penetrates the rear end of said air intake internal wall.

7. A turbine engine according to claim 4, wherein said front and rear ends that are fitted one inside the other are in direct contact with one another.

8. A turbine engine according to claim 4, wherein at least one spacer ring is positioned between said front and rear ends that are fitted one inside the other, and the at least one fastener passes through said spacer ring.

9. A turbine engine according to claim 4, wherein said front and rear ends are fitted one inside the other by way of a cylindrical surface.

10. A turbine engine according to claim 4, wherein which said front and rear ends are fitted one inside the other by way of a conical surface.

11. A turbine engine according to claim 1, wherein said rear end of said air intake internal wall and said front end of said fan casing are joined together via a connecting ring through which the at least one fastener penetrates.

12. A turbine engine according to claim 11, wherein said connecting ring is comprised of at least two segments.

13. A turbine engine according to claim 11, wherein said connecting ring comprises a transverse partition.

14. A turbine engine according to claim 1, wherein the at least one fastener is comprised of at least one nut or bolt.

15. A turbine engine according to claim 1, wherein at least one centering finger is provided for positioning at least one of said front or rear ends relative to the other about the turbine engine longitudinal axis.

\* \* \* \* \*